United States Patent Office 3,701,814
Patented Oct. 31, 1972

3,701,814
PROCESS OF ALKYLATION WITH BASE OF METAL OXIDE
Wilbur L. Shilling, Camas, Wash., assignor to Crown Zellerbach Corporation, San Francisco, Calif.
No Drawing. Filed Mar. 27, 1970, Ser. No. 23,502
Int. Cl. C07c 69/38, 69/76
U.S. Cl. 260—475 SC
2 Claims

ABSTRACT OF THE DISCLOSURE

A base catalyzed alkylation process wherein the base employed is a metal oxide wherein the metal is lithium, sodium, potassium, calcium or barium. The preferred base is calcium oxide and the preferred solvent is dimethyl sulfoxide.

BACKGROUND OF THE INVENTION

The present invention relates to an improved process for alkylating organic compounds containing an acidic hydrogen with an alkylating agent that is capable of undergoing nucleophilic substitution.

It is known that esters, such as malonic ester and acetoacetic ester, can be alkylated with organic halide alkylating agents such as alkyl, aryl, aralkyl or acyl halides. These reactions proceed via the formation of a carbanion intermediate by employing a strong basic catalyst.

The base conventionally employed is any of a wide variety of materials, but the criterion is that it must be a strong base in order to effect carbanion formation. Weak bases, such as sodium hydroxide, give low yields. Exemplary of suitable strong bases employed in the prior art include metal hydrides, such as sodium hydride; metal inorganic amides, such as sodium amide; alkali metal and alkaline earth metal organic amides, such as sodium methyl amide; metal alkoxides, such as sodium methoxide and potassium t-butoxide; metal alkyls, such as sodium ethyl and butyl lithium; and a mixture of sodium and ethanol. The expense of such base systems is too great to be commercially practical for many important and useful reactions.

SUMMARY OF THE INVENTION

According to the present invention it has been found that the alkylation of organic compounds containing acidic hydrogen may be effected by employing as the base a metal oxide wherein the metal is selected from the group consisting of lithium, sodium, potassium, calcium or barium, particularly the relatively inexpensive compound calcium oxide, in combination with an anhydrous, aprotic, dipolar solvent having a dielectric constant in excess of 30 at 25° C. The yields obtained employing such a base and solvent are higher than those obtained employing the best base system previously employed, i.e. a mixture of sodium and ethanol.

DETAILED DESCRIPTION OF THE INVENTION

The crux of the present invention resides in the discovery that base-catalyzed alkylation of organic compounds by alkylating agents may be enhanced by employing a metal oxide wherein the metal is selected from the group consisting of lithium, sodium, potassium, calcium or barium as the base (either alone or in conjunction with other bases previously known in the art) in combination with an aprotic, dipolar solvent having a dielectric constant in excess of 30 at 25° C.

Therefore, any organic compound previously known to undergo base-catalyzed alkylation may be employed to advantage in the present process, and any of those alkylating agents previously known to undergo nucleophilic substitution therewith may likewise be employed in the present process.

The organic compounds suitable for base-catalyzed alkylation may be characterized as those organic compounds having an acidic hydrogen attached to an atom therein which may be removed by a base to form an anion.

Ordinarily the acidic hydrogen contemplated is attached to a carbon atom, preferably a methylene carbon, and removal thereof forms a carbanion. However, the carbon atom may be methyl, methinyl, etc. In addition, the acidic hydrogen may be attached to other atoms, such as oxygen, sulphur, nitrogen or silicon.

Illustrative of preferred organic compounds suitable for alkylation are the $\beta$-keto esters, malonic ester (diethyl malonate) and acetoacetic ester (ethyl acetoacetate); the $\beta$-ketone, acetylacetone (2,4-pentanedione), the alcohol benzyl alcohol, and the amide pyrrolidone-2.

Other organic compounds that may be alkylated by the present process include monoalkyl malonic esters (e.g. diethyl butylmalonate); monoalkyl derivatives of acetoacetic ester (e.g. ethyl ethylacetoacetate); cyanoacetic esters (e.g. ethyl cyanoacetate); monoalkylated acetylacetones; aliphatic nitro compounds; enols; acetylenes; $\beta$-sulfonyl derivatives of esters, ketones and sulfones; barbiturates; imides (e.g. phthalimide) and thiohydantoins.

Alkylating agents that may be employed in the present process are various organic halides, such as alkyl halides having from 1 to about 18 carbon atoms; aralkyl halides wherein the alkyl branch contains from 1 to about 8 carbon atoms; and acyl halides having from 2 to about 18 carbon atoms. Also employable are dimethyl sulfate and diethyl sulfate.

Illustrative of preferred alkyl halides are methyl chloride, butyl iodide, dodecyl bromide and chloroacetic esters. Illustrative of aralkyl halides are various benzyl halides, such as benzyl chloride. Examples of suitable acyl halides are acetyl chloride and benzoyl halide.

The metal oxides that may be employed in the present process are calcium oxide, barium monoxide, sodium monoxide, potassium monoxide and lithium oxide. The preferred oxide is calcium oxide.

It is surprising and unexpected that the aforementioned metal oxides would effect the base-catalyzed alkylations described above, since it had always been considered that strong bases were required and these metal oxides are not strong bases. That is, sodium hydroxide and calcium hydroxide, for example, are not strong bases relative to removing the weakly acidic hydrogens of the alkylatable compounds cited above, and should be expected to function very poorly or not at all. By the same token, their anhydrous forms, sodium monoxide and calcium oxide, would be expected to have the same strength as their parent compounds. Surprisingly, these oxides appear to act as strong bases in the dipolar aprotic solvents disclosed herein, and promote the alkylations with great facility, although their hydroxides do not.

As previously mentioned, the solvent employed in the alkylations of the present invention must be an aprotic, dipolar solvent having a dielectric constant greater than about 30 at 25° C., in order for the metal oxide to be an effective base. The preferred such solvents are dialkyl sulfoxides having from 1 to 4 carbon atoms in each alkyl group, and cyclic sulfoxides having 5 atoms in the ring, including the sulfoxide sulfur atom. Particularly preferred amongst the alkyl sulfoxides is dimethyl sulfoxide. Other suitable solvents include dialkylformamides having from 1 to 4 carbon atoms per alkyl group, such as N,N-dimethylformamide; and dialkylacetamides having from 1 to 4 carbon atoms per alkyl group, such as dimethylacetamide. Other preferred solvents are cyclic amides having 5 atoms in the ring, such as N-methyl-2-pyrrolidone.

The ratio of base to reactants in the process of the present invention is dependent upon several factors, such as the particular metal oxide employed, the solvent and the nature of the alkylation reactants. The preferred ratio is at least 1:1 and a large excess (several times the theoretical molar amount) is sometimes desirable.

In carrying out the alkylation reactions as described herein, the ratio of solvent to base is not critical; however, since the metal oxides are practically insoluble in the solvents described herein, the amount of solvent should be sufficient to at least wet the surface of the base. It is, of course, important that water be substantially absent.

The reaction temperature employed in carrying out the alkylations described herein is desirably kept below the boiling point of the solvent, and preferably below about 100° C. The minimum temperature employed is about 15–20° C.

The following specific examples illustrate the process of the present invention employing a metal oxide as the base in carrying out alkylation reactions on various organic compounds having acidic hydrogen.

EXAMPLE 1

This example illustrates the alkylation of diethyl malonate employing calcium oxide as the base.

Eighty grams (0.5 mole) of diethyl malonate was added over a 30-minute period to a stirred slurry of dimethyl sulfoxide (DMSO) (76 grams-1 mole) and calcium oxide (42 grams-0.75 mole). The addition was not exothermic at 25° C. After 15 minutes, when approximately one-half of the malonate had been added, the temperature was increased by 40° C. by employing a water bath, and then to 50° C. when all of the malonate had been added. The mixture was stirred for an additional 10 minutes and no exotherm was observed.

Benzyl chloride (63.3 grams-0.5 mole) was then added to the stirred mixture in the flask over a 30-minute period at 53–55° C. No exotherm was observed. After the benzyl chloride addition, the mixture was stirred for two hours at 50–60° C., and then the temperature was increased to 70° C. in 15 minutes. At this point an exothermic reaction took place and the temperature inside the reaction flask rose to 80° C. in about two minutes. The contents of the flask were then cooled quickly to 50° C. with an ice water bath. The total reaction time at 50° C. or above was three hours after the addition of benzyl chloride.

The reaction mixture was then poured into water (200 milliliters) and acidified with concentrated hydrochloric acid (42 milliliters of 37–38% concentration). The organic layer was separated from the aqueous layer with a separatory funnel and the organic phase washed with saturated sodium chloride solution (100 milliliters) to remove DMSO. The weight of the crude organic phase was 111 grams.

Gas chromatography indicated that the crude organic layer consisted of diethyl benzylmalonate, furnishing a theoretical yield of 70%.

EXAMPLE 2

This example illustrates the employment of calcium oxide as the base in conjunction with sodium hydroxide.

A DMSO slurry containing 0.5 mole of sodium hydroxide was formed and 0.5 mole of calcium oxide added thereto. To this mixture was added 0.5 mole of diethyl malonate, dropwise. This addition resulted in an exothermic reaction and the reactants in the flask were kept below 40° C. with an ice water bath. The malonate addition was complete in 30 minutes.

Benzyl chloride (63.3 grams-0.5 mole) was then added dropwise over 45 minutes. The temperature in the reaction flask was maintained at 50–60° C. with a warm water bath. At times cooling was necessary to prevent the temperature of the exothermic reaction from exceeding 60° C. The reactants were heated at 50–60° C. for 90 minutes after completing the benzyl chloride addition.

At the end of 90 minutes' reaction time, gas chromatography indicated that the reaction mixture contained about 20% unreacted diethyl malonate and about 16% unreacted benzyl chloride. The reaction mixture was poured into water (100 milliliters) and acidified by the addition of concentrated (37–38%) hydrochloric acid (84 milliliters). The organic layer was separated from the aqueous layer and washed with saturated sodium chloride solution (100 milliliters) to remove DMSO. The weight of the crude organic layer was 112.7 grams. The yield of diethyl benzylmalonate was determined by gas chromatography to be 45% of the theoretical.

EXAMPLE 3

This example illustrates employing only sodium hydroxide as the base.

Eighty grams of diethyl malonate (0.5 mole) was added over 15 minutes to a stirred DMSO-caustic slurry containing 0.5 mole of sodium hydroxide. An exothermic reaction resulted and the temperature in the flask rose from 25–55° C. After completing the malonic ester addition, benzyl chloride (63.3 grams-0.5 mole) was added over a period of one hour at 50–60° C. This addition was only slightly exothermic. The reaction mixture was stirred at 50–60° C. for seven hours. The course of the reaction was followed by analyzing small samples from the reaction mixture by gas chromatography. At the end of the seven-hour reaction time, practically all the benzyl chloride had been used up.

The reaction mixture was poured into water (200 milliliters), acidified with concentrated (37–38%) hydrochloric acid (42 milliliters) and the organic layer was separated and washed with saturated sodium chloride solution (100 milliliters) to remove most of the DMSO. The weight of the crude organic layer was 97 grams.

A yield of 27% of theoretical of diethyl benzylmalonate was determined by gas chromatography.

The foregoing examples illustrate the great improvement obtained in yield when calcium oxide is employed as the base, either by itself or in conjunction with sodium hydroxide base, over sodium hydroxide by itself. This is summarized in the following table:

YIELDS OF DIETHYL BENZYLMALONATE

| Example | Solvent-base system used | Percent yield of diethyl benzylmalonate |
| --- | --- | --- |
| 1 | DMSO-CaO | 60–63 |
| 2 | DMSO-NaOH-CaO | 45 |
| 3 | DMSO-NaOH | 27 |
|   | $Na+C_2H_5OH$ | 51–57 |

The last base system described in the foregoing table ($Na+C_2H_5OH$) is one of the best prior art strong bases used. The yield reported for the latter is taken from the literature (E. C. Horning, "Organic Syntheses," Collective vol. 3, John Wiley & Sons, Inc., New York, 1955, p. 705) wherein the reaction time was 8–11 hours. It is seen that the weak base calcium oxide gives yields even higher than the prior art strong base system, and in a much shorter time.

EXAMPLE 4

This example illustrates the alkylation of acetylacetone.

Twenty-five grams (0.25 mole) of acetylacetone was added over 20 minutes to a stirred mixture of DMSO (100 grams) and calcium oxide (21 grams-0.375 mole). The addition resulted in an exothermic reaction and the temperature rose from 25–30° C. within three minutes after the addition had been started. The temperature inside the flask was kept below 30° C. with external cooling (ice water bath). The mixture was stirred below 30° C. for 20 minutes after the addition of the acetylacetone had been completed.

Methyl iodide (40 grams-0.28 mole) was added dropwise to the mixture over 30 minutes. This addition was also exothermic and the temperature in the flask was kept at 12–17° C. by cooling with an ice water bath. After completing the methyl iodide addition, the mixture was allowed to reach 30° C. The mixture was stirred for 60 minutes, or until the reaction was no longer exothermic.

An additional 100 grams of DMSO, together with 21 grams (0.375 mole) of calcium oxide was added to the mixture in the flask. Forty grams (0.28 mole) of methyl iodide was added to the mixture over 20 minutes at 16–19° C. The mixture was stirred for an additional 90 minutes with the temperature reaching 31° C.

Bloomfield's procedure (Journal of Organic Chemistry, vol. 26, No. 10:4112–5) was employed to work up the product. Gas chromatography indicated a yield of 3,3-dimethyl-2,4-pentanedione in the amount of 73% of theoretical.

EXAMPLE 5

This example illustrates the use of various metal oxides other than calcium oxide.

The general procedure of Example 1 is followed. Four reaction slurries are prepared with 1.0 mole of DMSO and 0.75 mole of either lithium oxide, sodium monoxide, potassium monoxide or barium monoxide therein, each of the four slurries containing a different metal oxide. Diethyl malonate and benzyl chloride are added in the amounts and under the general conditions of Example 1. In each case diethyl benzyl malonate is obtained as the product in relatively high yield.

EXAMPLE 6

This example illustrates the use of various dipolar, aprotic solvents other than DMSO having a dielectric constant greater than about 30 at 25° C.

The general procedure of Example 1 is followed except that slurries of calcium oxide (0.75 mole) are made up in 2 mole quantities of each of the following solvents: N,N-dimethylformamide, dimethylacetamide and N-methyl-2-pyrrolidone.

Diethyl malonate and benzyl chloride are added as in Example 1. In each case, diethyl benzyl malonate is obtained as the product in relatively high yield.

From the foregoing it is seen that an effective process for base-catalyzed alkylation of organic compounds having an acidic hydrogen has been disclosed wherein the base employed is a relatively inexpensive metal oxide, previously thought not strong enough to effect alkylation. The metal oxide is rendered effective as a base by employing an aprotic, dipolar solvent having a dielectric constant greater than 30 at 25° C.

I claim:

1. In the process of alkylating diethyl malonate with an organic halide capable of undergoing nucleophilic substitution in a base catalyzed system, the improvement comprising employing a metal oxide as the base wherein the metal is selected from the group consisting of lithium, sodium, potassium, calcium and barium, and carrying out the alkylation in an aprotic, dipolar solvent having a dielectric constant greater than about 30 at 25° C.

2. The process of claim 1 wherein the metal oxide is calcium oxide and the solvent is dimethyl sulfoxide.

References Cited

House: Modern Synthetic Reactions, p. 164, (1965).

LORRAINE A. WEINBERGER, Primary Examiner

E. J. SKELLY, Assistant Examiner

U.S. Cl. X.R.

260—257, 309.5, 326 R, 326.5 J, 465 D, 465.4, 470, 476 R, 481, 483, 485 R, 590, 593 R, 618 R, 632 R, 644, 645, 671 B, 671 C, 678, 607 A